Figure 1:
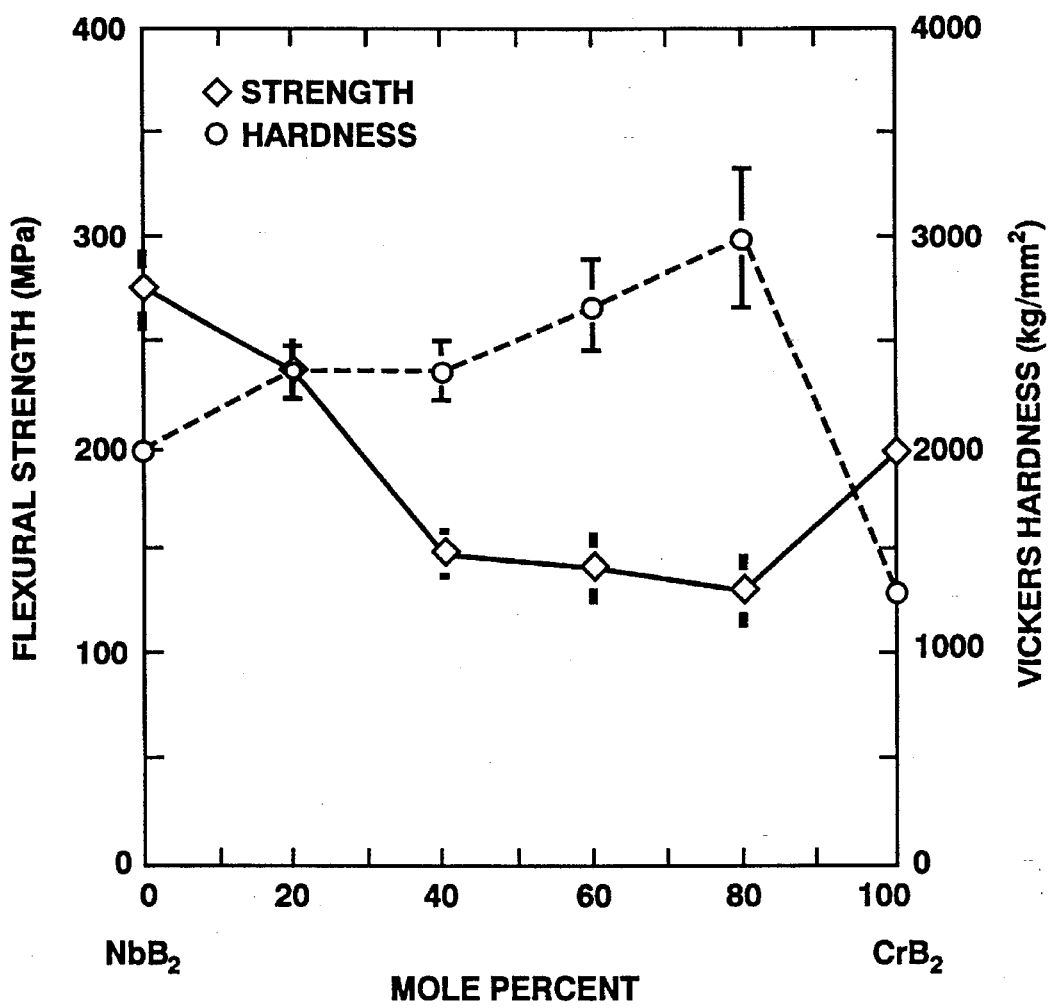

United States Patent [19]

Talmy et al.

[11] Patent Number: 5,604,165

[45] Date of Patent: *Feb. 18, 1997

[54] $CrB_2$-$NbB_2$/$Al_2O_3$ AND $CrB_2$-$NbB_2$/SiC CERAMIC COMPOSITE MATERIALS

[75] Inventors: Inna G. Talmy, Silver Spring; Eric J. Wuchina, Wheaton; James A. Zaykoski, Beltsville; Mark M. Opeka, Laurel, all of Md.

[73] Assignee: The United States of America as represented by the Secretary of the Navy, Washington, D.C.

[ * ] Notice: The portion of the term of this patent subsequent to Nov. 5, 2013, has been disclaimed.

[21] Appl. No.: 664,042

[22] Filed: Jun. 13, 1996

Related U.S. Application Data

[63] Continuation-in-part of Ser. No. 551,253, Oct. 31, 1995, Pat. No. 5,571,759.

[51] Int. Cl.[6] .................................................. C04B 35/58

[52] U.S. Cl. .................................................. 501/96; 501/92

[58] Field of Search .................................. 501/92, 96, 98, 501/127

[56] References Cited

U.S. PATENT DOCUMENTS

| | | | |
|---|---|---|---|
| 4,259,119 | 3/1981 | Watanabe et al. | 501/96 |
| 4,292,081 | 9/1981 | Watanabe et al. | 501/96 |
| 5,158,913 | 10/1992 | Saito et al. | 501/96 |

FOREIGN PATENT DOCUMENTS

| | | |
|---|---|---|
| 02-160670 | 6/1990 | Japan . |
| 03-174362 | 7/1991 | Japan . |

*Primary Examiner*—Karl Group
*Attorney, Agent, or Firm*—John Forrest; Roger D. Johnson

[57] ABSTRACT

A composite with a reinforcing material that is $Al_2O_3$, SiC, or mixtures thereof in a matrix that is a ceramic material based on a solid solution of $CrB_2$ and $NbB_2$.

25 Claims, 3 Drawing Sheets

$CrB_2$-$NbB_2$/$Al_2O_3$ AND $CrB_2$-$NbB_2$/SiC CERAMIC COMPOSITE MATERIALS

CROSS REFERENCE TO RELATED APPLICATION

This application is a continuation-in-part of copending U.S. patent application Ser. No. 08/551,253 filed on Oct. 31, 1995, now U.S. Pat. No. 5,571,759.

BACKGROUND OF THE INVENTION

This invention relates to ceramic materials and more particularly to ceramic materials based on metal borides.

Early studies on diboride materials had focused primarily on group VI metal diborides. Ceramics based on zirconium diboride ($ZrB_2$) and hafnium diboride ($HfB_2$) were developed through the 1960s by the U.S. Air Force for advanced hypersonic vehicle leading edges. While those materials are useful, it was desirable to improve their physical properties.

In U.S. Pat. No. 5,571,759 filed on Oct. 31, 1995 (parent of the present application), ceramic materials based on solid solutions of chromium diboride ($CrB_2$) and niobium diboride (NbB2) are disclosed which have excellent hardness and resistance to oxidation. Unfortunately, these materials have low strengths in the compositions having the highest hardness and highest resistance to oxidation. It would be desirable to produce materials having greater strength but which retain the excellent hardness and resistance to oxidation of the $CrB_2$—$NbB_2$ ceramic materials.

SUMMARY OF THE INVENTION

Accordingly, an object of this invention is to provide a new ceramic composite material.

Another object of this invention is to provide a new ceramic composite material that is strong.

A further object of this invention is to provide a new ceramic composite material that is very hard.

Yet another object of this invention is to provide a new ceramic composite material that is resistant to oxidation.

These and other objects of this invention are achieved by providing

A ceramic composite material comprising

A. from about 5 to about 35 volume percent of a reinforcing material that is alumina ($Al_2O_3$), silicon carbide (SiC), or mixtures thereof; and B. a ceramic material that is based on a solid solution comprising from more than zero to less than 100 mole percent of $CrB_2$ with the remainder in the solid solution being $NbB_2$.

DRAWINGS

Figure 2:
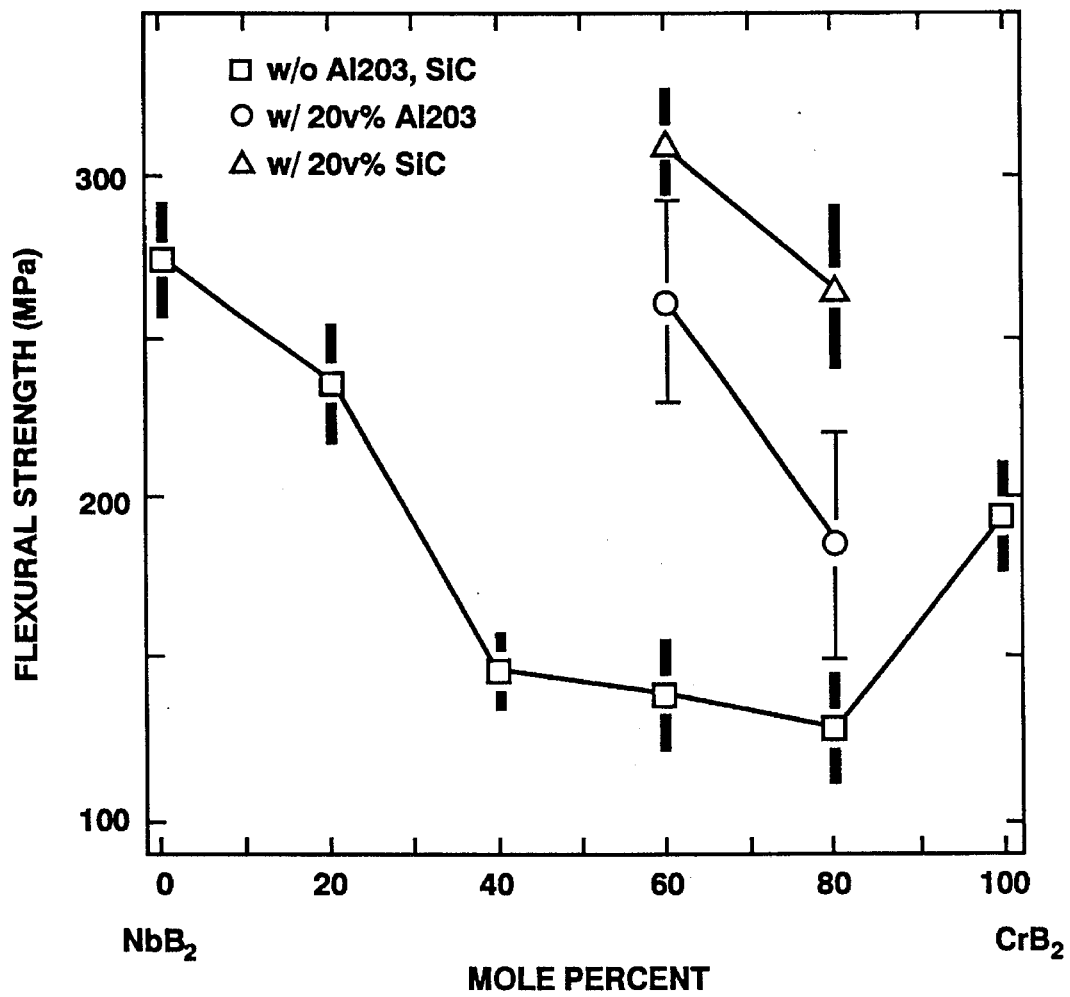
Figure 3:
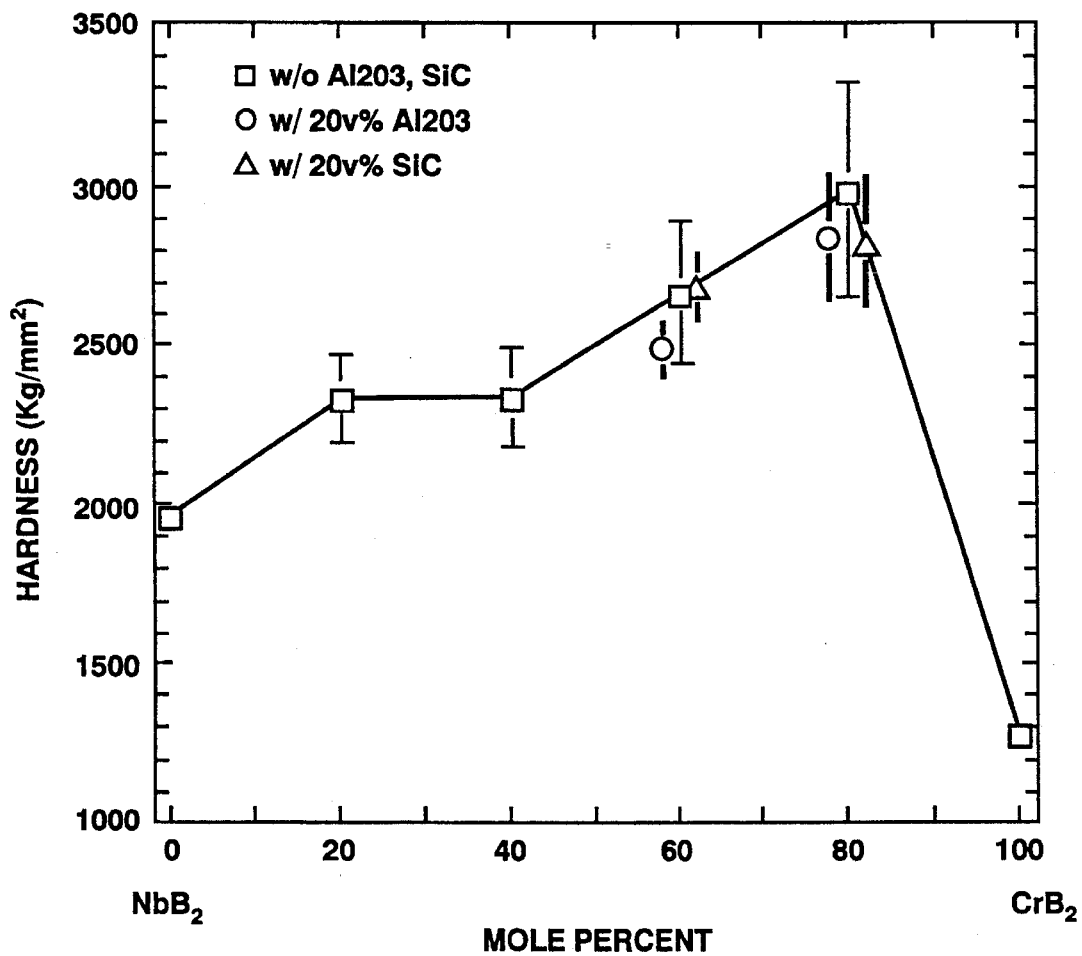

A more complete understanding of the invention and many of the attendant advantages thereto will be readily appreciated as the same becomes better understood by reference to the following detailed description when considered in connection with the accompanying figures wherein:

FIG. 1 is a graph of flexural strength and of hardness versus composition for ceramic materials based on $CrB_2$—$NbB_2$ solid solutions;

FIG. 2 a graph of strength versus composition for ceramic materials based on $CrB_2$—$NbB_2$ solid solutions (1) alone, (2) reinforced with 20 volume percent $Al_2O_3$, and (3) reinforced with 20 volume percent SiC; and FIG. 3 is a graph of hardness versus composition for the ceramic materials of FIG. 2.

DESCRIPTION

This application is a continuation-in-part application of copending U.S. Pat. No. 5,571,759 filed on Oct. 31, 1995 by Inna G. Talmy, Eric J. Wuchina, James A. Zaykoski, and Mark Opeka, and titled "$CrB_2$—$NbB_2$ Ceramics Materials", hereby incorporated by reference in its entirety.

In the Ser. No. 08/551,253 application ceramic materials based on a solid solutions of $CrB_2$ and $NbB_2$ are disclosed which are very hard and resistant to oxidation at elevated temperatures. Unfortunately, it has since been found that the flexural strength of these $CrB_2$—$NbB_2$ ceramic materials is lowest over the compositional range where hardness is greatest.

FIG. 1 is a plot of flexural strength (diamonds, ◊) and Vickers hardness (circles, ○) versus mole percent $CrB_2$ (0, 20, 40, 60, 80, and 100) in the $CrB_2$—$NbB_2$ solid solution. Each circle (○) is an average of the Vickers hardness measurements for that composition. The bars above and below the average hardness curve show the range of the Vickers hardness test results for each composition. Similarly, each diamond (◊) is an average of the flexural strength measurements for that composition. The bars above and below the average flexural strength curve show the range of the flexural strength test results for each composition. FIG. 1 shows an inverse relationship been the hardness (○) and the flexural strength (◊) of the $CrB_2$—$NbB_2$ solid solution ceramic materials. The compositions more desirable because of their hardness are less desirable because of their low flexural strength.

As shown in FIG. 2 and table 2, the $CrB_2$—$NbB_2$/$Al_2O_3$ and $CrB_2$—$NbB_2$/SiC ceramic composite materials of the present invention provide greater flexural strengths than the $CrB_2$—$NbB_2$ solid solution ceramic materials alone. Moreover, as shown in FIG. 3 and table 3, the $CrB_2$—$NbB_2$/$Al_2O_3$ and the $CrB_2$—$NbB_2$/SiC ceramic composite materials maintain excellent hardness. Data in Table 4 shows that $CrB_2$—$NbB_2$/$Al_2O_3$ ceramic composite materials have higher oxidation rates at 1100° C. and 1200° C. than the unreinforced $CrB_2$—$NbB_2$ ceramic materials. However, table 4 also shows that $CrB_2$—$NbB_2$/SiC ceramic composite materials have significantly lower oxidation rates than the corresponding unreinforced $CrB_2$—$NbB_2$ ceramic materials. SiC is the preferred reinforcement material because it produces composites with (1) greater flexural strength and (2) greater resistance to oxidation at higher temperatures. Moreover, the $CrB_2$—$NbB_2$/SiC composites can be prepared at higher temperatures than the $CrB_2$—$NbB_2$/$Al_2O_3$ composites.

The ceramic composite materials of the present invention preferably comprise from more than zero to about 40, more preferably from about 10 to about 30, still more preferably from 15 to 25, and even more preferably from 18 to 22 volume percent of a reinforcing material that is alumina ($Al_2O_3$) or silicon carbide (SIC) or mixtures of alumina and silicon carbide with the remainder of the ceramic composite material being a matrix of a ceramic based on a solid solution of $CrB_2$ and $NbB_2$. SiC is the more preferred reinforcement material. The $Al_2O_3$ and SiC reinforcement materials are preferably in the form of whiskers or powders (particles) with powders being more preferred. In the preferred embodiment $Al_2O_3$ particles or SiC particles are uniformly distributed throughout the $CrB_2$—$NbB_2$ solid solution ceramic matrix, resulting in strength being an isotropic property. The ceramic material of the matrix is based on a solid solution of chromium diboride ($CrB_2$) and niobium diboride ($NbB_2$). The $CrB_2$—$NbB_2$ solid solution comprises from more than zero to less than 100 mole percent $CrB_2$ with the remainder in the solid solution being $NbB_2$. When the composite is used at temperatures of 1000° C. or lower, the preferred compositional ranges of the $CrB_2$—$NbB_2$ solid solution are selected to provide hardness. For hardness, the ceramic matrix material is based on a $CrB_2$—$NbB_2$ solid solution having a composition of preferably from about 20 to about 90, more preferably from 50 to 85, still more preferably from 60 to 85, and even more preferably from 75 to 80 mole percent of $CrB_2$ with the remainder in the solid solution being $NbB_2$. For oxidation resistance when the composite is used at temperatures about 1000° C., the ceramic matrix material is based on a $CrB_2$—$NbB_2$ solid solution having a composition of preferably from about 15 to about 70, more preferably from 20 to about 60 mole percent $CrB_2$ with the remainder in the solid solution being $NbB_2$.

The first step in process of making the $CrB_2$—$NbCrB_2$/$Al_2O_3$ and $CrB_2$—$NbB_2$/$SiC_2$ composites of the present invention is the preparation of a mixture of the raw materials. For the preferred embodiment in which $Al_2O_3$ particles or SiC particles are uniformly distributed throughout a ceramic $CrB_2$—$NbB_2$ solid solution matrix, the $Al_2O_3$ or SiC powder, $CrB_2$ powder, and $NbB_2$ powder are uniformly and intimately mixed using conventional methods. For example, a slurry of the desired proportions of $Al_2O_3$ or SiC powder, $CrB_2$ powder, and $NbB_2$ powder and a volatile organic solvent (methanol, acetone, etc.) is formed and thoroughly mixed. The powder mixture is dried and then passed through a 500 micron screen three times. For composites in which the $Al_2O_3$ or SiC reinforcing material is not a powder (whiskers, fibers, etc.), an uniform, intimate mixture of the $CrB_2$ and $NbB_2$ powders is prepared and then mixed with the reinforcing material by suitable means. Whatever the form of the composite, it is necessary that the $CrB_2$ and $NbB_2$ powders are uniformly and intimately mixed so that the $CrB_2$—$NbB_2$ solid solution ceramic material is produced.

The $CrB_2$/$NbB_2$/$Al_2O_3$ or $CrB_2$/$NbB_2$/$SiC$ is then hot pressed until the intimately mixed $CrB_2$ and $NbB_2$ powders are converted into a $CrB_2$—$NbB_2$ solid solution which forms a matrix in which the $Al_2O_3$ or SiC reinforcement material particles, whiskers, or pieces are distributed. For simple geometric shapes conventional die hot pressing techniques are used. More complex ceramic bodies can be prepared by conventional hot isostatic pressing (HIP). The hot pressing must be done in a noble gas (argon, helium, neon, etc.) atmosphere or in a vacuum.

Samples of $CrB_2$—$NbB_2$ solid solution ceramic materials which were prepared using a graphite die are listed in table 1. Table 1 gives the compositions of the intimate mixtures of CrB2 and $NbB_2$ powders used, as well as the process temperature, pressure, and time for each composition.

TABLE 1

| MATRIX COMPOSITION | | | | PROCESS CONDITIONS | | |
|---|---|---|---|---|---|---|
| Mole % | | Weight % | | Temperature | Pressure | Time |
| $NbB_2$ | $CrB_2$ | $NbB_2$ | $CrB_2$ | (°C.) | (MPa) | (min.) |
| 100 | 0 | 100 | 0 | 2100 | 20 | 30 |
| 95 | 5 | 96.76 | 3.27 | 2100 | 30 | 30 |
| 90 | 10 | 93.33 | 6.66 | 2000 | 30 | 30 |
| 80 | 20 | 86.15 | 13.84 | 2000 | 30 | 30 |
| 60 | 40 | 70.00 | 30.00 | 1900 | 30 | 30 |
| 40 | 60 | 50.91 | 49.09 | 1900 | 30 | 30 |
| 20 | 80 | 28.01 | 72.00 | 1900 | 30 | 30 |
| 10 | 90 | 14.74 | 85.35 | 1900 | 30 | 30 |
| 5 | 95 | 7.57 | 92.43 | 1900 | 30 | 30 |
| 0 | 100 | 0 | 100 | 1900 | 20 | 30 |

The melting point (~2200° C.) of $CrB_2$ limits the upper end of the process temperature range. The process temperature should be at least 50 degrees below the melting point of $CrB_2$. The process conditions in table 1 can also be used when the $CrB_2$—$NbB_2$ solid solution matrix is reinforced with SiC (m.p. ~2700° C.). However, when the $CrB_2$—$NbB_2$ solid solution matrix is reinforced with $Al_2O_3$ the process temperature is preferably about 2000° C. or less because of the relatively low melting point of $Al_2O_3$. Good quality $CrB_2$—$NbB_2$/$Al_2O_3$ composites were prepared at 2000° C. For $Al_2O_3$ reinforced $CrB_2$—$NbB_2$ solid solution composed of from more than 5 to less than 100 mole percent $CrB_2$ with the remainder being $NbB_2$ in the solid solution a process temperature of 2000° C., process pressure of 30 MPa, and process time of 30 minutes works well. For $Al_2O_3$ reinforced $CrB_2$—$NbB_2$ solid solution having from more than zero to 5 mole percent $CrB_2$, a process temperature of 2000° C. or less can be used by increasing the process time, pressure, or both. Finally, again it should be emphasized that the hot pressing used to form either the $CrB_2NbB_2$/SiC or the $CrB_2NbB_2$/$Al_2O_3$ composites must be done in a noble gas (argon, helium, neon, etc.) atmosphere or vacuum.

EXPERIMENTAL

The process of making the $CrB_2$—$NbB_2$ solid solution ceramic materials and the $Al_2O_3$ or SiC particle reinforced $CrB_2$—$NbB_2$ solid solution ceramic composites began with the preparation of an intimate mixture of the appropriate amounts of $CrB_2$, $NbB_2$, SiC, and $Al_2O_3$ powders. Commercially available $CrB_2$, $NbB_2$, SiC, and $Al_2O_3$ powders having a particle size and purity suitable for ceramic processing are used. $CrB_2$ powders (99.5% purity, −325 mesh) and $NbB_2$ powders (99.5% purity, −325) mesh from CERAC INC. were used. $Al_2O_3$ powders (99.9% purity, 3.5 micron average size) from Alcoa and SiC powders (98.5 % purity, 4.0 micron average size) from Electro Abrasives Corporation were used as reinforcement materials. The intimate mixture is formed by conventional means. In the examples, a slurry of the desired proportions of $CrB_2$ powder, $NbB_2$ powder, and SiC powder or $Al_2O_3$ powder and a volatile organic solvent (methanol, acetone, etc.) was formed and thoroughly mixed. The $CrB_2$/$NbB_2$ powder mixture, $CrB_2$/$NbB_2$/SiC powder mixture, or $CrB_2$/$NbB_2$/$Al_2O_3$ powder mixture was dried and passed through a 500 micron screen 3 times. The intimate powder mixture was then hot pressed to form the plain ceramic or composite ceramic material.

FIG. 2 provides a comparison of the flexural strengths of unreinforced $CrB_2$—$NbB_2$ solid solution ceramic materials (squares, ☐), with the $CrB_2$—$NbB_2$ solid solution reinforced with 20 volume percent $Al_2O_3$ powder (circles, ○), or with 20 volume percent SiC powder (triangles, ◊). The points (□, ○, Δ) represent averages of the flexural strength measurements for that composition with the bars or lines above and below the points representing the range of flexural strength measurements for that composition. Table 2 summarizes the average flexural strength measurements for each composition.

TABLE 2

Flexural Strength of Ceramics in the System $NbB_2$—$CrB_2$, with and without additives

| Composition | Flexural Strength (MPa) | Standard Deviation |
|---|---|---|
| 100 $NbB_2$ | 274.8 | 17.2 |
| 20$CrB_2$/80$NbB_2$ | 236.6 | 15.6 |
| 40$CrB_2$/60$NbB_2$ | 146.9 | 9.6 |
| 60$CrB_2$/40$NbB_2$ | 139.5 | 14.25 |
| 80$CrB_2$/20$NbB_2$ | 129.8 | 13.9 |
| 100$CrB_2$ | 195.0 | 14.4 |
| 60$CrB_2$/40$NbB_2$ + 20% $Al_2O_3$ | 261.8 | 31.9 |
| 60$CrB_2$/40$NbB_2$ + 20% SiC | 311 | 14.6 |
| 80$CrB_2$/20$NbB_2$ + 20% $Al_2O_3$ | 185.8 | 36.3 |
| 80$CrB_2$/20$NbB_2$ + 20% SiC | 267.1 | 24.0 |

As can be seen from FIG. 2 and table 2, the addition of $Al_2O_3$ or SiC particles substantially increases the flexural strength of the $Crb_2$/$NbB_2$ solid solution ceramic materials. For example the flexural strength of 60 mole % $CrB_2$/40 mole % $NbB_2$ was increased from 139.5 MPa to 261.8 MPa by the use of 20 volume % $Al_2O_3$ and to 311 MPa by the use of 20 volume % SiC. Similarly, the flexural strength 80 mole % $CrB_2$/20 mole % $NbB_2$ was increased from 129.8 MPa to 185.8 MPa by the use of 20 volume % $Al_2O_3$ and to 267.1 MPa by the use of 20 volume % SiC. However, for the composites to be useful, the increases in flexural strength must be accomplished with little loss in hardness.

FIG. 3 provides a comparison of the Vickers hardnesses of unreinforced $CrB_2$—$NbB_2$ solid solution ceramic materials (squares, □), with the $CrB_2$—$NbB_2$ solid solution reinforced with 20 volume percent $Al_2O_3$ powder (circles, ○), or with the $CrB_2$—$NbB_2$ solid solution reinforced with 20 volume percent SiC powder (triangles, Δ). The Vickers method of hardness testing was used with a 20 Kg load. The points (□, ○, Δ) represent averages of the Vickers hardness measurements for that composition with the lines above and below the points representing the range of hardness measurements for that composition. Note that the $CrB_2$—$NbB_2$/$Al_2O_3$ points (○) and the $CrB_2NbB_2$/SiC points (ΔΔ) (and their associated lines) have been offset from the 60 mole percent point and the 80 more percent point in order to be more easily read. The composites ($Al_2O_3$ and SiC) were made with 60 mole percent $CrB_2$+40 mole percent $NbB_2$ and with 80 mole percent $CrB_2$ +20 mole percent $NbB_2$, however. Table 3 summaries the average Vickers hardness measurements for each composition.

TABLE 3

| COMPOSITION | HARDNESS* (Kg/mm²) |
|---|---|
| 100$NbB_2$ | 1960 ± 40 |
| 20$CrB_2$/80$NbB_2$ | 2340 ± 128 |
| 40$CrB_2$/60$NbB_2$ | 2350 ± 150 |
| 60$CrB_2$/40$NbB_2$ | 2670 ± 224 |

TABLE 3-continued

| COMPOSITION | HARDNESS* (Kg/mm²) |
|---|---|
| 80$CrB_2$/20$NbB_2$ | 3000 ± 335 |
| 100$CrB_2$ | 1300 ± 40 |
| 80 Vol % 60$CrB_2$/40$NbB_2$ + 20 Vol % $Al_2O_3$ | 2500 ± 88 |
| 80 Vol % 60$CrB_2$/40$NbB_2$ + 20 Vol % $Al_2O_3$ | 2700 ± 101 |
| 80 Vol % 80$CrB_2$/20$NbB_2$ + 20 Vol % $Al_2O_3$ | 2850 ± 221 |
| 80 Vol % 80$CrB_2$/20$NbB_2$ + 20 Vol % SiC | 2830 ± 205 |

*determined by Vickers hardness test using a 20 Kg load

As shown by FIG. 3 and Table 3, the addition of either $Al_2O_3$ or SiC particles as reinforcement material causes very little reduction in hardness of the $CrB_2$/$NbB_2$ solid solution material.

Finally, the composite material should have good resistance to oxidation at elevated temperatures. Comparative data for the oxidation of the composites at elevated temperatures is given in table 4.

TABLE 4

Oxidation (2 hours) of $NbB_2$—$CrB_2$ Ceramics with $Al_2O_3$ and SiC Additions Data is Given as Weight Gain/Surface Area (× 10⁴ grams)

| Composition* | 1100° C. | 1200° C. |
|---|---|---|
| 60$CrB_2$/40$NbB_2$ | −2.6 | 11 |
| 60$CrB_2$/40$NbB_2$ + 20 v % $Al_2O_3$ | 23.61 | 177 |
| 60$CrB_2$/40$NbB_2$ + 20 v % SiC | 42.57 | 21.6 |
| 80$CrB_2$/20$NbB_2$ | 162 | 469 |
| 80$CrB_2$/20$NbB_2$ + 20 v % $Al_2O_3$ | 301 | 675 |
| 80$CrB_2$/20$NbB_2$ + 20 v % SiC | 73.7 | 64 |

*materials were hot pressed at 1900° C.

For temperatures below 1000° C. the $Al_2O_3$-reinforced and the SiC-reinforced $CrB_2$—$NbB_2$ solid solution ceramic materials are resistant to oxidation as are unreinforced $CrB_2$—$NbB_2$ solid solution ceramic materials. Table 4 shows that at temperatures of 1100° C. and 1200° C. the $Al_2O_3$-reinforced $CrB_2$—NbB2 solid solution ceramic material are more susceptible to oxidation and the SiC-reinforced solid solution ceramic materials are less susceptible to oxidation than the corresponding unreinforced materials.

For maximum hardness with good flexural strength and low rates of oxidation at elevated temperatures, the preferred embodiment is a composite based on 20 volume percent silicon carbide (SiC) particles uniformly distributed in 80 volume percent of a matrix of a solid solution of 80 mole percent $CrB_2$ and 20 mole percent of $NbB_2$. The composite is preferably formed by hot pressing at 2000° to 2100° C. in an inert atmosphere (argon, helium, neon, etc.) or in vacuum.

Obviously, other modifications and variations of the present invention may be possible in light of the foregoing teachings. It is therefore to be understood that within the scope of the appended claims the invention may be practiced otherwise than as specifically described.

What is claimed is:

1. A composite comprising

A. from more than zero to about 40 volume percent of a reinforcement material that is $Al_2O_3$, SiC, or mixtures thereof; and B. the remainder of the composite being a matrix of a ceramic material based on a solid solution comprising from more than zero to less than 100 mole percent $CrB_2$ with $NbB_2$ being the remainder in solid solution.

2. The composite of claim 1 wherein the reinforcement material is in the form of a powder.

3. The composite of claim 2 wherein the reinforcement material is uniformly distributed throughout the solid solution of $CrB_2$ and $NbB_2$.

4. The composite of claim 1 wherein the reinforcement material is $Al_2O_3$.

5. The composite of claim 1 wherein the reinforcement material is SiC.

6. The composite of claim 1 wherein the reinforcement material comprises from about 10 to about 30 volume percent of the composite.

7. The composite of claim 6 wherein the reinforcement material comprises from 15 to 25 volume percent of the composite.

8. The composite of claim 7 wherein the reinforcement material comprises from 18 to 22 volume percent of the composite.

9. The composite of claim 1 wherein the solid solution comprises from about 20 to about 90 mole percent of $CrB_2$ with $NbB_2$ being the remainder in the solid solution.

10. The composite of claim 9 wherein the solid solution comprises from 50 to 85 mole percent of $CrB_2$ with $NbB_2$ being the remainder in the solid solution.

11. The composite of claim 10 wherein the solid solution comprises from 60 to 85 mole percent of $CrB_2$ with $NbB_2$ being the remainder in the solid solution.

12. The composite of claim 11 wherein the solid solution comprises from 75 to 80 mole percent of $CrB_2$ with $NbB_2$ being the remainder in solid solution.

13. The composite of claim 1 wherein the solid solution comprises from 15 to 70 mole percent of $CrB_2$ with $NbB_2$ being the remainder in solid solution.

14. The composite of claim 13 wherein the solid solution comprises from 20 to 60 mole percent of $CrB_2$ with $NbB_2$ being the remainder in solid solution.

15. The composite of claim 5 wherein the reinforcement material is SiC powder.

16. The composite of claim 15 wherein the SiC powder is uniformly distributed throughout the solid solution of $CrB_2$ and $NbB_2$.

17. The composite of claim 5 wherein the reinforcement material comprises from about 10 to about 30 volume percent of the composite.

18. The composite of claim 17 wherein the reinforcement material comprises from 15 to 25 volume percent of the composite.

19. The composite of claim 18 wherein the reinforcement material comprises from 18 to 22 volume percent of the composite.

20. The composite of claim 5 wherein the solid solution comprises from about 20 to about 90 mole percent of $CrB_2$ with $NbB_2$ being the remainder in the solid solution.

21. The composite of claim 20 wherein the solid solution comprises from 50 to 85 mole percent of $CrB_2$ with $NbB_2$ being the remainder in the solid solution.

22. The composite of claim 21 wherein the solid solution comprises from 60 to 85 mole percent $CrB2$ with $NbB_2$ being the remainder in the solid solution.

23. The composite of claim 22 wherein the solid solution comprises from 75 to 80 mole percent of $CrB_2$ with $NbB_2$ being the remainder in solid solution.

24. The composite of claim 5 wherein the solid solution comprises from 15 to 70 mole percent $CrB_2$ with $NbB_2$ being the remainder in solid solution.

25. The composite of claim 24 wherein the solid solution comprises from 20 to 60 mole percent of $CrB_2$ with $NbB_2$ being the remainder in the solid solution.

* * * * *